United States Patent [19]

Bernard

[11] Patent Number: 4,637,106
[45] Date of Patent: * Jan. 20, 1987

[54] PROCESS FOR THE PRODUCTION OF A LAMINATED CAPACITOR

[75] Inventor: Daniel Bernard, Seurre, France

[73] Assignee: L.C.C.-C.I.C.E.-Compagnie Europeenne de Composants Electroniques, Bagnolet, France

[*] Notice: The portion of the term of this patent subsequent to Jan. 6, 2004 has been disclaimed.

[21] Appl. No.: 627,527

[22] Filed: Jul. 3, 1984

[30] Foreign Application Priority Data

Jul. 6, 1983 [FR] France .................. 83 11258

[51] Int. Cl.⁴ .................................. H01G 4/32
[52] U.S. Cl. ........................ 29/25.42; 29/423; 242/56.1
[58] Field of Search ............... 29/25.42, 423; 242/56.1

[56] References Cited

U.S. PATENT DOCUMENTS 3,670,378  6/1972  Behn et al. ............. 29/25.42
4,488,340 12/1984  Rayburn ................. 29/25.42

Primary Examiner—Carl E. Hall
Attorney, Agent, or Firm—Oblon, Fisher, Spivak, McClelland, & Maier

[57] ABSTRACT

A process for the production of laminated capacitors constituted by a stack of dielectric layers separated by metallic foils or plates, those of the even and uneven rows being respectively interconnected by lateral electrical connections. A plurality of juxtaposed master capacitors is produced on a large diameter wheel and a common intercalated layer is used between two successive stacks of master capacitors. The separation of the master capacitor stacks takes place after metal spraying 1 of the lateral edges of the group, so as to maintain the equilibrium thereof and permit the metal spraying of the other lateral edge prior to the separation of the master capacitors and optional cutting up into individual capacitors.

9 Claims, 6 Drawing Figures

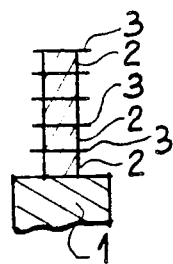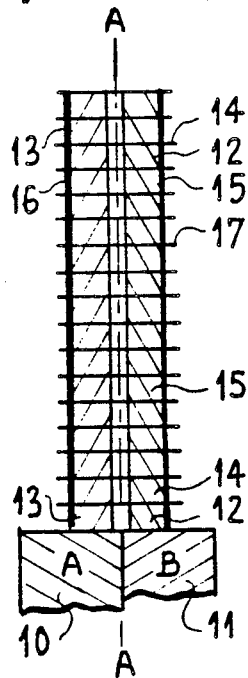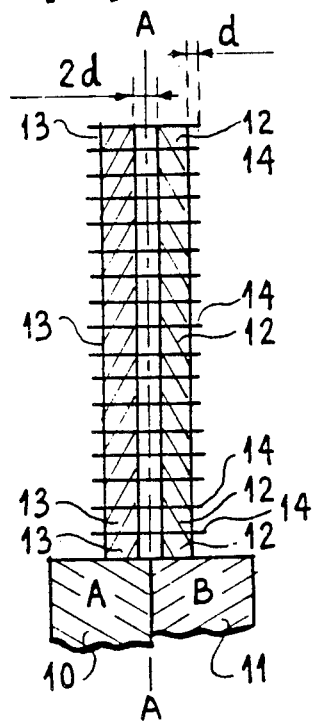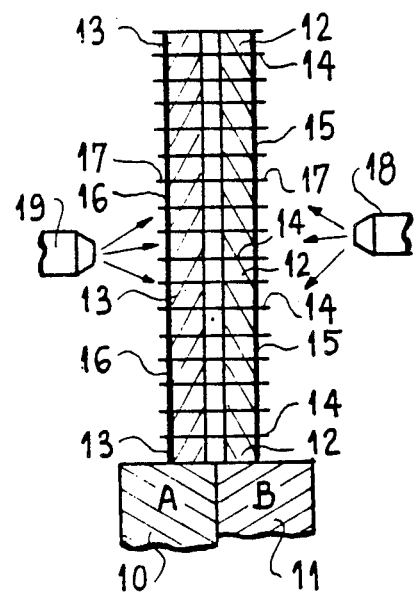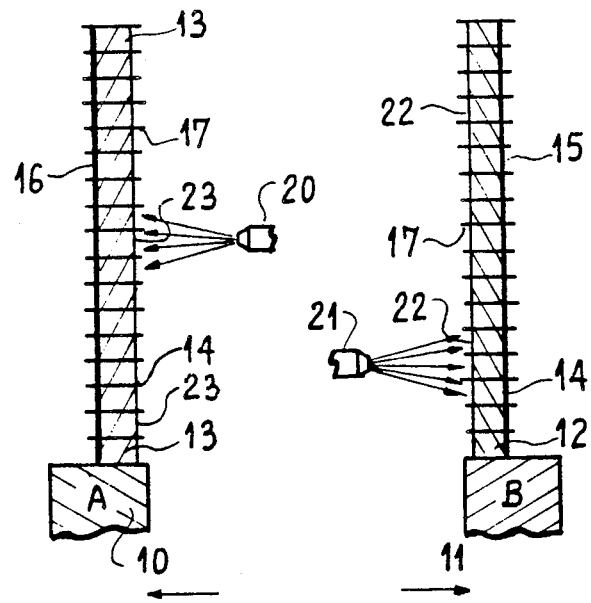

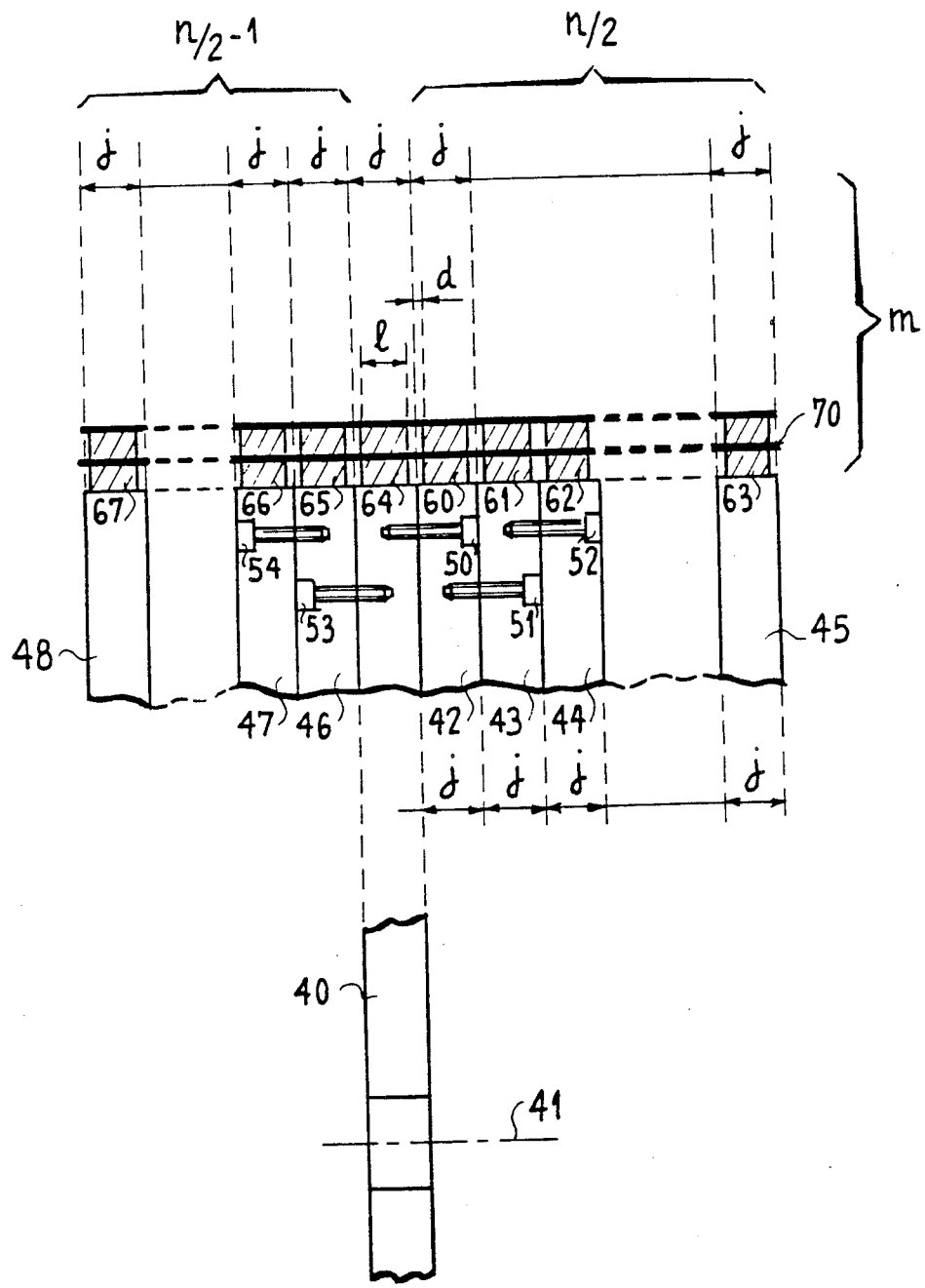

PROCESS FOR THE PRODUCTION OF A LAMINATED CAPACITOR

BACKGROUND OF THE INVENTION

The present invention relates to a process for the production of laminated capacitors constituted by a stack of dielectric sheets separated by metal layers, plates or foils, those of the even and uneven rows being respectively interconnected by lateral electrical connections. It more particularly relates to the production of master capacitors obtained by winding on a large diameter wheel metallized dielectric films, each master capacitor being separated from the following master capacitors by a separating and/or intercalated layer. If necessary, each master capacitor can then be cut into individual capacitors of smaller sizes. In other cases, it can be used as it is.

French Pat. No. 2,011,553 describes such a production procedure for master capacitors and individual capacitors obtained by cutting up the former. It consists of simultaneously winding two lateral displaced, metallized, dielectric films so as to obtain a first stack on the rim of a larger diameter wheel. An intercalated layer having a width exceeding that of the thus formed master capacitor is then introduced onto the latter in the manner described e.g. in German Patent application No. 2,424,368. A second master capacitor is then wound onto the intercalated layer, without it being necessary to cut the metallized dielectric films. Such a process for the production of capacitors has numerous variants, like those described in the two aforementioned specifications. It is also possible to stack dielectric films on a flat surface in the manner described in French Pat. Nos. 879,280 and 903,040. No matter what the stacking process used, it is also useful to use intercalated layers permitting the simultaneous metal spraying of the lateral edges of all the master capacitors and facilitating their separation after metal spraying.

Although this process suffers from no difficulties when using relatively wide metallic, dielectric films, it is found that in the case of relatively narrow films, it becomes necessary to limit the height of the stack of master capacitors, otherwise the stack rests to the right or to the left with respect to the wheel and this can occur at different stages of the production process.

The limitation to the height of the different stacks or the group of stacks on each wheel considerably reduces the interest of such a process when using it with films of limited width, which is only a few millimeters. It is found that when using roughly 1 cm wide films, it is possible to form a plurality of stacks over a height of approximately 10 cm. However, when using 5 mm wide films, the stack height is limited to approximately 2 cm.

SUMMARY OF THE INVENTION

The invention makes it possible to solve this problem in a simple and effective manner. Thus, the invention relates to a process wherein:
- a—n Juxtaposed master capacitors are produced in per se known manner on the same support,
- b—a common intercalated layer is placed on the n master capacitors,
- c—on said common intercalated layer is placed a further group of n juxtaposed master capacitors, whose edges are substantially aligned with those of the preceding stage in the same stack,
- d—m stages of n master capacitors are successively produced in this way,
- e—the two lateral edges of the assembly undergo metal spraying,
- f—separation takes place parallel to the metal sprayed lateral edges between two successive stacks of master capacitors, so as to produce two groups of master capacitors having a metal sprayed lateral edge and a lateral edge which is not metal sprayed,
- g—the other lateral edge of each group is metal sprayed,
- h—stages f and g are recommenced if necessary, so as to obtain n groups of m master capacitors, whereof the two lateral edges are metal sprayed,
- i—the master capacitors are separated from one another.

The individual capacitors are then produced from the master capacitors in per se known manner.

The separation stage f between the two stacks can be carried out in different ways.
1. It is possible to laterally metal spray the two lateral edges, form a separation between stacks n and n−1, metal spray the two thus formed lateral edges, recommence the same operation between stacks n−1 and n−2, etc.
2. When n is even, it is possible to carry out the separation between stacks 1 and 2 on the one hand, n and n−1 on the other, metal spray the four thus produced lateral edges, etc. This manner of proceeding is of greater industrial interest when the capacitors have been wound onto a wheel which is rotated during the metal spraying, because this reduces the duration of the handling operations.

It has been found that in the above process, the presence of a common intercalated layer makes it possible to obtain a greater stability of the group during winding and thus obtain the same stack heights as in the case of capacitors produced with wide films. It is also found that during the separation parallel to the metal sprayed lateral edges (stage f), the presence of the metal sprayed coatings on one of the edges of the group makes it possible to prevent any collapse thereof despite the limited width of the film and the considerable height of the group. It is then merely necessary to metal spray the other edge in the normal way to bring about a final holding effect.

Obviously, the two alternatives of the aforementioned stage f can be combined. For example, when there is an uneven number of juxtaposed wound master capacitors (n odd), as in the second alternative, it is possible to simultaneously separate the outer stacks of said group of m×n master capacitors until three juxtaposed master capacitors are obtained in which case the first alternative is applied.

The common intercalated layer used in the process according to the invention must be separable into a plurality of intercalated layers during stage f of the process. Therefore, the intercalated layer is preferably an adequately rigid plastic film, which can be cut with a saw, a hot wire, a laser beam, etc, or which is precut with a series of successive notches in the form of dots so as to facilitate separation. This intercalated layer can also be a metal film, which can be cut with a saw or precut in the manner indicated hereinbefore.

The distance separating each master capacitor $(m_i, n_j)$ of the stack from the closest capacitor of the adjacent stack $(m_i, n_{j+1}$ or $n_{j-1})$ is preferably adequate so that after separating two adjacent groups, the intercalated layers project sufficiently to serve as inserts after metal spraying the lateral edges. However, it is also possible to position them sufficiently close to one another to only permit the passage of the cutting means between two vertical stacks of m superimposed master capacitors, the essential function of the common intercalated layer is that it is common during winding and up to the metal spraying of a lateral edge ensuring an adequate stability to the group of m master capacitors.

The films are stacked by winding onto a large diameter wheel in per se known manner. Preferably, there is a simultaneous winding of n master capacitors of each stage. Obviously, it is preferable for stability reasons, that each of the juxtaposed n stacks between two successive intercalated layers has substantially the same height, i.e. the same number of turns is simultaneously wound for each stack.

In order to perform the aforementioned process in a simple, effective and economic manner, preference is given to the use of a large diameter wheel equipped with a plurality of rims (n−1 separable rims from the nth integral with the wheel). For example, each rim is fixed to the preceding rim so as to permit easy disassembly. The width of each rim exceeds the width of the films to be wound for producing master capacitors and is equal to or greater than each intercalated layer following separation of the common intercalated layer. In other words, the sum of the width of the rims is substantially equal to the width of the common intercalated layer.

It is obviously possible to wind in juxtaposed manner, films of different widths and thus simultaneously obtain master capacitors of different widths. For this purpose, it is merely necessary to adapt the width of the rims and that of the capacitors to be produced in accordance with the details given hereinbefore.

BRIEF DESCRIPTION OF THE DRAWINGS

The invention is described in greater detail hereinafter relative to non-limitative embodiments and with reference to the attached drawings, wherein show:

FIG. 1 a diagrammatical sectional view illustrating the process according to the prior art.

FIGS. 2 to 5 the different stages of the process according to the invention in the simplified case of two groups of master capacitors wound in juxtaposed manner.

FIG. 6 a simplified sectional view of a multirim wheel making it possible to simultaneously wind a plurality of master capacitors.

DETAILED DESCRIPTION OF THE PREFERRED EMBODIMENTS

FIG. 1 diagrammatically shows in sectional form, a partial view of a group of master capacitor stacks according to the prior art. The rim of a large diameter wheel 1 supports a plurality of master capacitors 2, which are separated from one another by intercalated layers 3 having a width greater than the width of the master capacitors 2, so that during the following stage of metal spraying the group of master capacitors superimposed in this way, it is possible for the intercalated layers to project, so as to facilitate the separation of the master capacitors 2 after metal spraying. Such a procedure is described in the prior art and in particular in the aforementioned specifications. The disadvantage of this process is the lack of stability of the stack when the master capacitors 2 have a limited width, which necessarily limits the number of superimposed master capacitors, in order to prevent the collapse of the group before the end of the metal spraying operations.

FIGS. 2 to 5 show the different stages of the process according to the invention, illustrated diagrammatically with two juxtaposed groups of stacks. Two contiguous supports 10, 11 (e.g. two juxtaposed wheels A, B, or one wheel to which is fixed a rim 11, receive in each case a plurality of stacks respectively 13 and 12 (m stacks 12 and 13 in height), each group of two stacks (n=2 in the present case) being provided with a common intercalated layer 14, which projects on either side of the left-hand edge of stack 13 and the right-hand edge of stack 12 in the drawing. The projection will have a value of substantially d, which makes it possible then for intercalated layer 14 to also serve a separation function after metal spraying. The stack groups 13, 12 are separated by a distance of approximately 2d and are arranged in substantially symmetrical manner relative to the axis AA along which the two supports A and B are contiguous. Obviously, therefore, if the procedure of separating the intercalated layer along line AA leads during this operation to the disappearance of a good part of thickness 2d, it may be necessary to take account of this by adding said thickness to dimensions 2d in order to enable the intercalated layer to also fulfil this function.

In FIG. 2, the stacks 12 and 13 are produced by the simultaneous winding of two metallized, dielectric films having a metallized lateral margin, as is the case in the prior art. The height of the stacks is the same and the width of each of the rims 10 and 11 compared with that of the film has no importance in the case of two capacitors, all that is important is the substantially symmetrical position (although this is not necessary) of the group with respect to axis AA.

FIG. 3 shows the following stage of the process according to the invention, during which the lateral edges of the group of stacks 12, 13 are metal sprayed, thus forming the lateral metal spraying connections 15, 16 respectively on the lateral edges of each master capacitor. Following metal spraying, the intercalated layers 14 still project slightly at points such as 17. Metal spraying is carried out in per se known manner using spray guns 18, 19, which are displaced in a relative manner, either simultaneously or sequentially in front of each of the lateral edges to be metal sprayed.

FIG. 4 diagrammatically shows the stage of cutting the group of stacks. This cutting takes place in the manner indicated hereinbefore as a function of the type of layer 14 used. Cutting substantially takes place along axis AA, so that after separation along the latter, each intercalated layer 14 can also fulfil its separation function. Obviously, this is not necessary in the case of two juxtaposed stacks as shown in the drawings, when they are located at a distance exceeding 2d. According to a preferred embodiment of the invention, the essential point is that after cutting the intercalated layers, each of them projects from the lateral edges of the master capacitors by a distance of at least d (accepting that distance d is the minimum distance necessary for the intercalated layer, following metal spraying, to permit the easy separation of the master capacitors, the distance obviously being dependent on the metal spraying conditions).

In FIG. 5, the two supports 10 and 11 are separated from one another e.g. by wheel 10 on one side and rim 11 on the other, each support A, B supporting a group of stacks 13, separated by intercalated layers or portions thereof 14. These stacks, which have a much greater height than in the case of FIG. 1 although the master capacitors have an identical cross-section, are kept in equilibrium due to the presence of a metal sprayed layer 15, 16 on one of their lateral edges. Thus, the final operation of the process according to the invention consists of metal spraying the lateral edges of the stacks which have not yet been sprayed using guns 20, 21 and thereby forming metal sprayed layers 23, 22. At this stage of the process, it is a question of a return to the same conditions as in the prior art and the separation of the master capacitors from one another, as well as the possible cutting into individual capacitors can take place in per se known manner.

FIG. 6 is a diagrammatic sectional view of n×m juxtaposed stacks, each group of m stacks being produced on a rim fixed to the preceding rim. In this case, the formation of master capacitors with the same width is shown, whilst the production of capacitors with different widths can easily be deduced from this example. A wheel 40 rotating about an axis 41 supports a plurality of rims 42, 43, 44, 45, etc on the right-hand part of the drawing and 46, 47, 48, etc on the left-hand part thereof. Thus, for example, there is n/2−1 rim on the left-hand part of wheel 40 fixed thereto and n/2 rim fixed to the right-hand part of wheel 40. For example, each rim is fixed by means of several screws (only one is shown in the drawing) to the preceding rim, such that screws 50 fix rim 42 to wheel 40, 51 fixing rim 43 to rim 43, 52 fixing rim 44 to rim 43, etc or 53 fixing rim 46 to wheel 40, 54 fixing rim 47 to rim 46, etc. In this case, each rim has the same width, which is identical to that of the wheel and wil be called j throughout the remainder of the description. Onto each of these rims are simultaneously wound master capacitors such as 60, 61, 62, etc, 63, etc, 64, 65, etc, 67. Following the winding of the desired number of turns, the common intercalated layer 70 is placed over the group of master capacitors. The operation then continues in the manner indicated hereinbefore until each stack has a width substantially equal to one, leaving a distance d=(j−1/2) adequate to permit the intercalated layer to fulfil its function after cutting. Obviously, it is necessary in the present case, to carry out a marking of the lateral edges of the films during said winding, so as to align them with one another in substantially the same way, no matter which stage m is being considered. This takes place in the same way as in the prior art, where the problem is the same. This is followed by the metal spraying of the outer edges of the group and the separation of rims 45 and 48. The non-sprayed edges of the stacks located on the two rims 45 and 48 are then sprayed and the capacitors separated in per se known manner. The unsprayed edges of the n−2 groups of m master capacitors fixed to wheel 40 are also sprayed and so on until a group of two capacitors is obtained on wheel 40 and then the procedure is as in FIGS. 2 to 5.

Obviously, in the above example, it is assumed that n was an even number as explained hereinbefore. If n is an uneven number (i.e. 2p+1), p rims are placed on one side of the wheel and p rims on the other side thereof and the aforementioned procedure is again adopted until three groups of m master capacitors are obtained on three successive rims. This is followed by cutting along axis AA, so as to only leave on one side a group of m superimposed master capacitors with a sprayed lateral edge, whereof the other side is metal sprayed, and a group of 2m master capacitors with a metal sprayed lateral edge, whereof the second side is sprayed and the same procedure is adopted as in the examples of FIGS. 2 to 5.

Obviously, the term intercalated layer has a wider meaning than that given in the above examples and also covers separating and/or intercalated layers according to French Pat. No. 2,011,553 and their four use variants which form part of the scope of the invention. The only point necessary for the necessarily intercalated layer according to the invention is that it is continuous between two master capacitors of the same stage, so as to bring about a heightwise holding of the master capacitors during winding. However, said intercalated and/or separating layer is not necessarily wider after cutting than the actual master capacitor, as explained in the aforementioned French patent.

What is claimed is:

1. A process for the production of laminated capacitors constituted by a stack of dielectric sheets separated by metal layers, plates or foils, those of the even and uneven rows being respectively interconnected by lateral electrical connections, wherein:
   a—n juxtaposed master capacitors are produced by stacking dielectric sheets separated by metal layers, plates or foils on the same support,
   b—a common interalated layer is placed on the n master capacitors,
   c—on said common intercalated layer is placed a further group of n juxtaposed master capacitors, whose edges are substantially aligned with those of the preceding stage in the same stack,
   3—m stages of n master capacitors are successively produced in this way,
   e—the two lateral edges of the assembly undergo metal spraying,
   f—separation takes place parallel to the metal sprayed lateral edges between two successive stacks of master capacitors, so as to produce two groups of master capacitors having a metal sprayed lateral edge and a lateral edge which is not metal sprayed,
   g—the other lateral edge of each group is metal sprayed,
   h—stages f and g are recommenced if necessary, so as to obtain n groups of m master capacitors, whereof the two lateral edges are metal sprayed,
   i—the master capacitors are separated from one another.

2. A process for the production of laminated capacitors according to claim 1, wherein separation stage f between two successive stacks is firstly carried out between stacks n and n−1, said separation stage being followed by the metal spraying of the two thus produced lateral edges, followed by the recommencement of the same operation of the two stacks n−1 and n−2, etc until n groups of m master capacitors are obtained, whereof the two lateral edges are metal sprayed, after which stage i of the process is performed.

3. A process for the production of laminated capacitors in which the number n in the stack is an even number, according to claim 1, wherein during the separation stages f, g and h between two stacks and the metal spraying of the lateral edges, separation takes place between stacks n and n−1 on the one hand and stacks 1 and 2 on the other, followed by the metal spraying of the four thus produced lateral edges, etc, so as to obtain n groups of m master capacitors, whereof the two lateral edges are metal sprayed, after which stage i of the process is performed.

4. A process for the production of laminated capacitors according to claim 1, in which the number of m master capacitors is uneven, wherein stages f, g and h of the process consist of separating the stacks between groups n and n−1 on the one hand and 1 and 2 on the other, metal spraying the four thus created lateral edges, recommencing the operation until three juxtaposed master capacitors are obtained, separating the stacks between two of the three successive stacks, metal spraying the two thus created lateral edges and then commencing the same operation with the two remaining stacks, and finally performing stage i of the process.

5. A process for the production of laminated capacitors according to claim 1,
   wherein use is made of an intercalated layer in the form of a plastic film.

6. A process for the production of laminated capacitors according to claim 1,
   wherein the common intercalated layer is a metal intercalated layer.

7. A process for the production of laminated capacitors according to claim 1,
   wherein the intercalated layer is precut at locations between these stacks.

8. A process for the production of laminated capacitors according to claim 1,
   wherein the distance between each master capacitor of a stack and the closest capacitor of the adjacent stack is adequate so that after separation of two adjacent stacks, the intercalated layers project so as to permit the separation of the master capacitors along the intercalated layer portions following the metal spraying of the lateral edges.

9. A process for the production of laminated capacitors according to claims 1,
   wherein each master capacitor is produced by the simultaneous winding of two metallized plastic films, whereof the metallic coatings are laterally displaced with respect to one another.

* * * * *